(12) United States Patent
Chang

(10) Patent No.: US 6,422,610 B1
(45) Date of Patent: Jul. 23, 2002

(54) DEFORMABLE FLUID SUPPLY LINE

(75) Inventor: Chi-Wei Chang, Hsin Chu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 11 days.

(21) Appl. No.: 09/637,948

(22) Filed: Aug. 11, 2000

(51) Int. Cl.7 .................................................. F16L 51/00
(52) U.S. Cl. .......................... 285/298; 285/187; 285/224
(58) Field of Search ................................ 285/223, 298, 285/187, 381.1, 224

(56) References Cited

U.S. PATENT DOCUMENTS

| | | | | | |
|---|---|---|---|---|---|
| 323,834 A | * | 8/1885 | Turner | ......................... | 285/223 |
| 398,526 A | * | 2/1889 | McCloskey | .................. | 285/223 |
| 700,378 A | * | 5/1902 | Schmidt | ...................... | 285/223 |
| 2,068,876 A | * | 1/1937 | Snyder | ......................... | 285/223 |
| 3,847,184 A | * | 11/1974 | God | .............................. | 285/223 |
| 4,218,812 A | * | 8/1980 | Jonsson | ....................... | 285/223 |
| 4,239,264 A | * | 12/1980 | Evans | ......................... | 285/187 |
| 4,728,128 A | * | 3/1988 | Frey et al. | ................... | 285/187 |
| 5,195,784 A | * | 3/1993 | Richter | ......................... | 285/61 |
| 5,803,506 A | * | 9/1998 | Argersinger et al. | ........ | 285/223 |

* cited by examiner

*Primary Examiner*—Eric K. Nicholson
(74) *Attorney, Agent, or Firm*—Randy W. Tung

(57) ABSTRACT

A deformable fluid supply line for use on a semiconductor fabrication machine is described which includes a generally S-shaped expandable joint connecting between two straight conduit sections for providing full communication therein-between and for providing stress absorbing characteristics such that the expandable joint can be stretched or otherwise deformed by at least 2 cm without breaking connections with the two straight conduit sections. When the generally S-shaped expandable joint is provided with a length of at least 10 cm, a deformation of at least 3.5 cm can be tolerated by the expandable joint without causing failure or otherwise damages in the connections with the two straight conduit sections. The deformable fluid supply line can survive an earthquake of the magnitude of Richter 5 scale. The invention further discloses a method for connecting a deformable fluid supply line to a fabrication machine by using an S-shaped joint connected in between two straight conduit sections. The present invention novel deformable fluid supply line can survive various forms of deformations including stretching, compressing, twisting and bending.

18 Claims, 2 Drawing Sheets

DEFORMABLE FLUID SUPPLY LINE

FIELD OF THE INVENTION

The present invention generally relates to a fluid supply line used in a semiconductor fabrication facility and more particularly, relates to a deformable fluid supply line used in a semiconductor fabrication facility that is capable of surviving a low level of deformation without damages and a method for shock-proving a fluid supply line.

BACKGROUND OF THE INVENTION

In the semiconductor process industry, a large variety of different ultrapure gasses are used in the fabrication plants. These gases include bulk gases such as $N_2$, $O_2$, $H_2$ and Ar which are normally used in very large quantities, and specialty gases such as He, $A_2F_3$, $PH_3$, $SiH_4$, $NH_2$ and $NF_3$ which are used only in small quantities. In general, the bulk gases are used for purging of chambers, oxidation and cleaning of cleaning of wafers, while the specialty gases are used as reactant or etching gases.

The bulk gases are normally stored in large storage facilities, for instance $N_2$ can be supplied from a liquified-nitrogen storage tank located in the gas yard or delivered from a pipeline from a remote air-separation; $O_2$ and Ar can be supplied from liquified gas storage tanks; while $H_2$ can be delivered from either a liquified-gas storage tank or a bank of high-pressure gas cylinders. The bulk gases are normally passed through purifiers and gas filters for removing impurities and contaminating particles before allowed to enter a gas-distribution piping system installed inside a cleanroom. On the other hand, the specialty gases are normally stored in small quantities in gas cylinders and are sent directly to the process tools from cylinders stored inside gas cabinets in the cleanroom. The gas cabinets are exhausted safety enclosures that contain the gas cylinders and the necessary gas handling equipment. The gas cabinets serve a major function of allowing purging and safe exchange of the specialty gas cylinders. The gas handling equipment, which includes gas panels incorporating all components for the control and monitoring of high purity gases. In most semiconductor fabrication facilities, the gas cabinet contains at least two process cylinders to allow easy switch-over when one cylinder is empty. In addition, another cylinder of inert gas such as nitrogen is provided for purging the piping line.

In most fabrication processes, the supply pressure for the bulk and the specialty gases is kept at under 10 Kg/cm². A few exceptions exist such as chlorine and dichlorosilane. At each point of use, the pressure of the bulk or specialty gas has to be independently and locally controlled by a series of flow control valves, pressure regulators, pressure sensors and particle filters located inside a gas manifold box. The precise pressure required for each bull: or specialty gases to be delivered to a specific process tool is determined by the process requirement. In most semiconductor cleanroom facility; one or more gas manifold boxes are installed nearby to each process tool to facilitate gas distribution and control.

A typical bulk gas distribution system 10 is shown in FIG. 1. The gas distribution system 10 is used, for instance, to distribute an inert gas such as helium. The system 10 consists essentially of two gas supply sources, i.e. a main gas supply source 12 which is a trailer mounted gas source and a back-up gas supply source 14 which is a plurality of gas cylinders with their outlets 16 parallelly connected. The gas from the main gas supply source 12 is fed to a three-way flow control valve 18 through conduit 22. The conduit 22 further includes flow control valves, pressure regulators, pressure sensors and particle filters which are not shown for simplicity reasons. The back-up gas supply source 14 is also connected to the three-way flow control valve 18 through conduit 24 for feeding a gas to the process tool 20 through the three-way flow control valve 18 when the valve is manually switched over upon an indication that the pressure of the main gas supply source 12 has dropped to a level that requires replacement. The conduit 24 further includes flow control valves, pressure sensors, pressure regulators and particle filters which are not shown. Conduit 20 feeds the process gas to process tool 30.

The conduit 20 that feeds the process gas to process tool 30 is normally provided in one-half inch diameter stainless steel piping that has a length of several tens of meters long. For instance, it is not uncommon to have process gas delivered to a process machine through pipes of 40 or 50 meter length. The length of tubing is set up in a straight line with bends of 90° to reach its destiny i.e, the process machine. It has been found that when a displacement of the process machine, or otherwise the piping has occurred, the piping itself may be fractured or the connection between the piping and the process machine may be damaged and thus causing a leak of the process gas. The displacement of the gas feed pipe and/or the process machine can easily occur in a fabrication facility due to mis-handling of the equipment. In certain geographical area, i.e. in California or in certain Asian Pacific regions, earthquake frequently occurs to present a great potential for such displacements. It is therefore desirable to provide gas feeding pipes that can be used to absorb shock or deformation due to mishandling of the equipment or due to earthquake.

Attempts such as using bellows in gas supply lines for absorbing shock, displacement or defamation have been made by others. However, since bellows are frequently fabricated of materials having a smaller thickness, i.e. in order to provide flexibility, they can be easily damaged by mis-handling by an operator or by displacement caused by an earthquake. The use of bellows is therefore inadequate to prevent damages to gas supply lines.

SUMMARY OF THE INVENTION

It is therefore an object of the present invention to provide a deformable fluid supply line for use in a semiconductor fabrication facility that does not have the drawbacks or shortcomings of the conventional fluid supply lines.

It is another object of the present invention to provide a deformable fluid supply line for use in a semiconductor fabrication facility that incorporates generally S-shaped expandable joints.

It is a further object of the present invention to provide a deformable fluid supply line for use in a semiconductor fabrication facility by using generally S-shaped expandable joint that is capable of deforming at least 2 cm without breaking from the supply line.

It is another further object of the present invention to provide a deformable fluid supply line for a semiconductor fabrication machine which contains generally S-shaped expandable joints that have a length of at least 10 cm.

It is still another object of the present invention to provide a deformable fluid supply line incorporating at least one deformable joint therein that is capable of surviving a low level earthquake without incurring damages.

It is yet another object of the present invention to provide a deformable fluid supply line incorporating at least one deformable joint therein which is capable of being deformed by at least 2.0 cm when the length of the deformable joint is 10 cm.

It is still another further object of the present invention to provide a method for connecting a deformable fluid supply line to a fabrication machine by providing a generally S-shaped deformable joint connected in series with the fluid supply line.

It is yet another further object of the present invention to provide a method for connecting a deformable supply line to a semiconductor fabrication machine by incorporating a generally S-shaped deformable joint connected in series with the supply line that survives a defamation of at least 2 cm without breaking connections with the supply line.

In accordance with the present invention, a deformable fluid supply line for use in a semiconductor fabrication machine and a method for connecting a deformable fluid supply line to a fabrication machine are provided.

In the preferred embodiment, a deformable fluid supply line for a semiconductor machine is provided which includes a first rigid conduit that has a first open end and an opposing second open end, the first open end is in fluid communication with a fluid reservoir, a second rigid conduit which has a third open end and an opposing fourth open end, the fourth open end is in fluid communication with the semiconductor fabrication machine, and a generally S-shaped expandable joint for connecting and providing fluid communication between the second open end of the first rigid conduit and the third open end of the second rigid conduit, the expandable joint can be stretched by at least 2 cm without fracturing and breaking the connection between the first rigid conduit and the second rigid conduit.

In the deformable fluid supply line for a semiconductor fabrication machine, the generally S-shaped expandable joint is connected to the first and the second rigid conduit by welded joints. The generally S-shaped expandable joint may be fabricated of stainless steel, the first and the second rigid conduit may have a length of at least 5 cm, and the generally S-shaped expandable joint may have a length of at least 10 cm. The generally S-shaped expandable joint may have a length of at least 10 cm to provide a deformation of at least 3.5 cm in the expandable joint without failure in the connections with the first and second rigid conduit when the fluid supply line is deformed.

In the deformable fluid supply line for use in a semiconductor fabrication machine, the first and the second rigid conduit may have a length of at least 10 cm, and the generally S-shaped expandable joint may have a length of at least 10 cm. The fluid supply line may include at least three rigid conduit sections sealingly connected together by at least two S-shaped expandable joints. The fluid supply line may further include at least four rigid conduit sections sealingly connected together by at least three S-shaped expandable joints. The deformable supply line may be fabricated of stainless steel. The expandable joint survives deformation of at least 2 cm without causing failure in the connections with the first and the second conduit when the deformation is selected from the group consisting of stretching, compressing, twisting and bending.

The present invention is further directed to a deformable fluid supply line incorporating at least one deformable joint therein which includes a first conduit that has a first and a second end, the first end is in fluid communication with a fluid reservoir, a second conduit that has a first and a second end, the first end is in fluid communication with a cavity in a process chamber, and a deformable joint of generally S-shape making connections and providing fluid communication between the second end of the first conduit and the first end of the second conduit by welding to the second end and the first end.

In the deformable fluid supply line incorporating at least one deformable joint, the deformable joint is of generally S-shape which survives deformation of at least 2 cm when stretched or compressed without causing failure in the connections with the first and the second conduit. The deformable joint of generally S-shape survives deformation of up to 45° when twisted or bent without causing failure in the connections with the first and the second conduit. The deformable joint of generally S-shape is fabricated of stainless steel. The first and the second conduit may have a length of at least 5 cm, the generally S-shaped deformable joint may have a length of at least 10 cm.

The present invention is still further directed to a method for connecting a deformable fluid supply line to a fabrication machine that includes the operating steps of providing a first conduit that has a first end and a second end, connecting the first end of the first conduit to a fluid reservoir in providing fluid communication therewith, providing a second conduit that has a first end and a second end, connecting the second end of the second conduit to a fabrication machine and providing fluid communication therewith, providing a generally S-shaped deformable joint that has two open ends, and connecting the two open ends of the S-shaped joint to the second end of the first conduit and the first end of the second conduit, respectively such that the S-shaped joint survives a deformation of at least 2 cm without breaking connections with the first and second conduit.

The method for connecting a deformable fluid supply line to a fabrication machine may further include the step of connecting the two open ends of the S-shaped joint to the second end of the first conduit and the first end of the second conduit by a welding method. The first and second conduit provided may be made of stainless steel and have a length of at least 5 cm. The generally S-shaped deformable joint may be fabricated of stainless steel to a length of at least 10 cm for providing a deformation of at least 3.5 cm in the deformable joint without failure in the connections.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1:
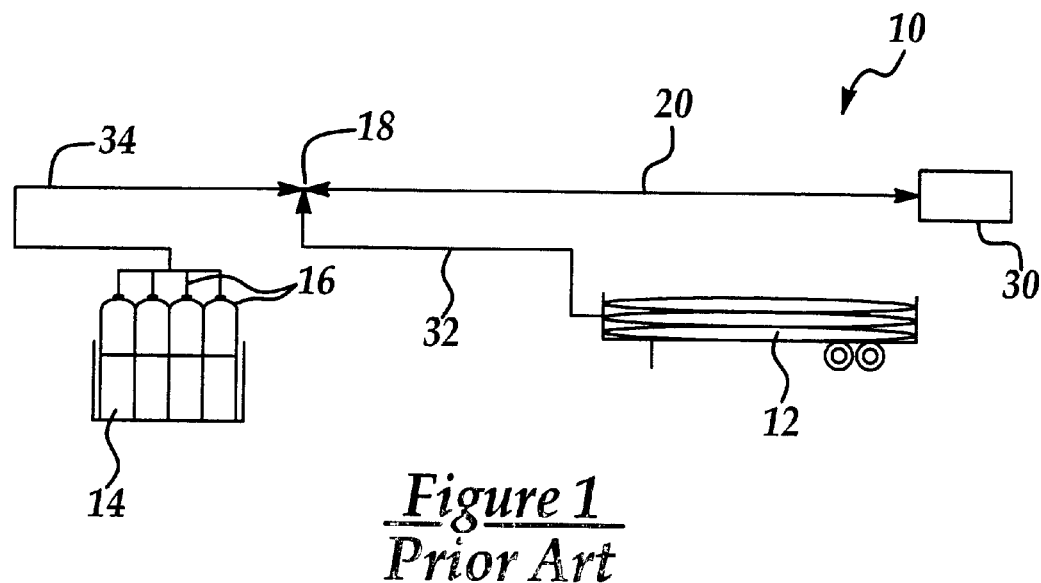
FIG. 1 is an illustration of a conventional gas supply system to a semiconductor fabrication equipment.

The present invention discloses a deformable fluid supply line for use in a semiconductor fabrication facility for feeding a processed gas to a fabrication machine. The invention further discloses a method for connecting a deformable fluid supply line to a semiconductor fabrication machine that is capable of surviving a low level (i.e. less than Richter 5 scale) earthquake without damages.

In the deformable fluid supply line, a first rigid conduit and a second rigid conduit are first provided with the first conduit in fluid communication with a fluid reservoir and the second conduit in fluid communication with a process machine. A generally S-shaped expandable joint is used to connect and to provide fluid communication between the first rigid conduit and the second rigid conduit. The expandable joint can be stretched or compressed by at least 2 cm without fracturing or breaking connections between the joint and the first rigid conduit and the second rigid conduit. The expandable joint is further capable of surviving twisting or bending—type deformation up to 45° without causing failure in the connections with the first and second rigid conduits.

The present invention deformable fluid supply line, which includes the rigid conduits and the S-shaped expandable joints is fabricated of a high rigidity and high chemical resistant metal such as stainless steel. A typical size of the conduit is about ¼ inch in diameter for flowing a process gas therethrough. The diameter of the generally S-shaped expandable joint is therefore similar to ¼ inch. The contour of the S-shaped expandable joint is at least 5 cm length, and preferably at least 10 cm length. Each curved section of the S-shape has a diameter of at least 2.5 cm, and preferably at least 5 cm.

The deformable fluid supply line for the semi-conductor fabrication machine may include at least two straight rigid conduit sections each having a minimal length of 5 cm connected thereinbetween by a S-shaped expandable joint connecting and providing fluid communication between the two rigid conduits. The S-shaped expandable joint has a length of at least 5 cm, and preferably at least 10 cm. In order to provide a sealing engagement between the expandable joint and the rigid conduit, welded joints are preferably used to provide a leak-proof seal. When the generally S-shaped expandable joints is provided with a length of at least 10 cm, a deformation of at least 3.5 cm in the expandable joint can be tolerated without causing failure in the connections with the first and second rigid conduits when the fluid supply line is deformed by stretching or compressing. The expendable joint may further survive deformations of at least 2 cm without causing failure in the connections with the first and second conduits when the deformation is stretching, compressing, twisting or bending. The deformable joint of S-shape may further survive deformation up to 45° when twisted or bent without causing failure in the connections.

The invention further discloses a method for connecting a deformable fluid supply line to a fabrication machine by first providing a generally S-shaped deformable joint and then connecting two open ends of the S-shaped joint to a first conduit and a second conduit, respectively such that the S-shaped joint survives a deformation of at least 2 cm without breaking connections with the two conduits. The method may further include the step of making the connections between the S-shaped joint and the first and second conduit by a welding method.

Figure 2:
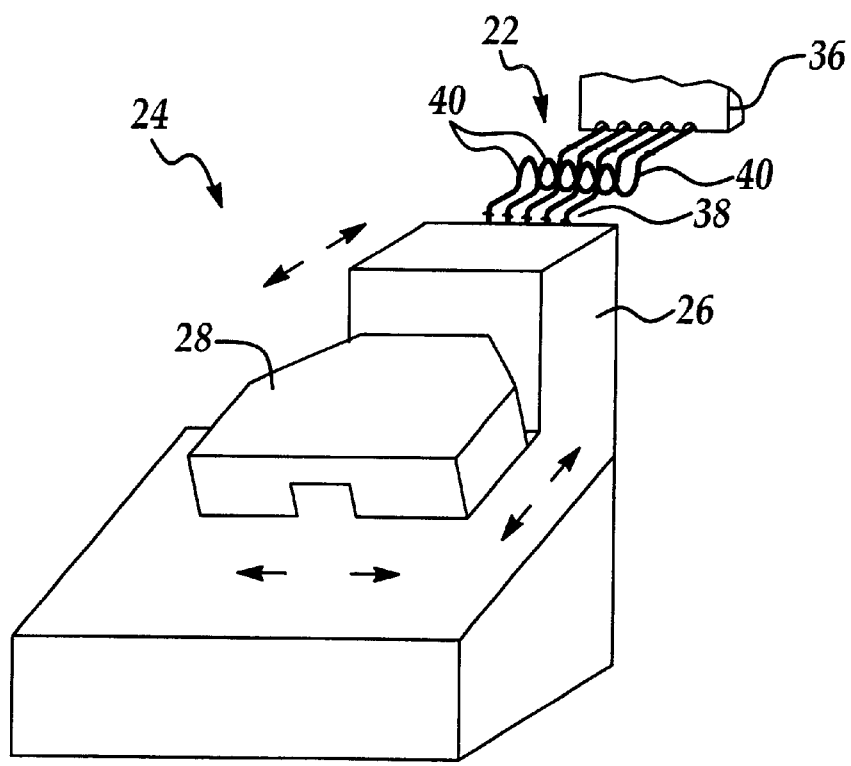
FIG. 2 is an illustration of a present invention deformable fluid supply line for a semiconductor fabrication equipment.

Referring initially to FIG. 2, wherein a present invention fluid supply line 22 in a semiconductor fabrication apparatus 24 is shown. The fabrication apparatus consists of a process chamber 26 and a wafer loading/unloading apparatus 28. The fluid supply lines 22 are supported at one end by a support means 36 and at the other end by a support means 38 before it enters into the process chamber 26. It is seen that, as part of the fluid supply line 22, S-shaped expandable joints 40 are incorporated in the supply lines 22. The total length of the supply lines 22 may be at least several tens of meters, for instance, maybe a length of 40~50 meters.

Figure 3:
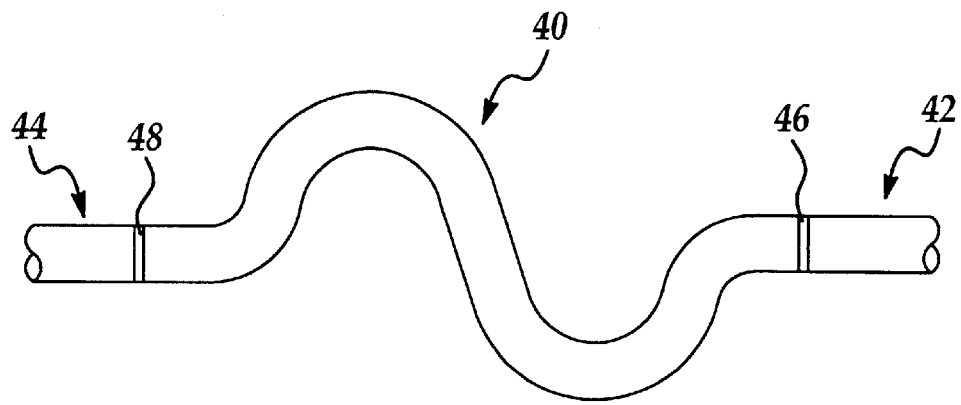
FIG. 3 is a side view of an S-shaped expandable joint used in the present invention deformable fluid supply line.

FIG. 3 is a side view of a S-shaped expandable joint 40 connected at both ends to conduits 42,44. The S-shaped expandable joint 40, or deformable joint is normally made of stainless steel similar to that for forming the straight conduit sections 42,44. A frequently used size of the conduit 42,44 and the expandable joint 40 is ¼ inch diameter. The S-shaped expandable joint 40 provides the benefits that it deform in all directions by absorbing the deformation stress without damaging the joint 40 or breaking the connections 46 and 48. The type of deformations may include stretching, compressing, twisting and bending. The connections 46,48 may be suitably formed by a welding method between the stainless steel conduit and the stainless steel joint 40 such that a leak-proof seal is formed for preventing leakage. The S-shaped expandable joint is formed in a symmetrical manner, i.e. the two curved sections are formed in a mirror image each having a diameter between about 2 cm and about 5 cm when the total length of the expandable joint 40 is between about 5 cm and about 10 cm. The welding of the connections 46,48 can be performed by using standard welding techniques for stainless steel. The shape of the two curved sections may be suitably changed based on the material or diameter used to provide maximum deformation without damages.

Figure 4:
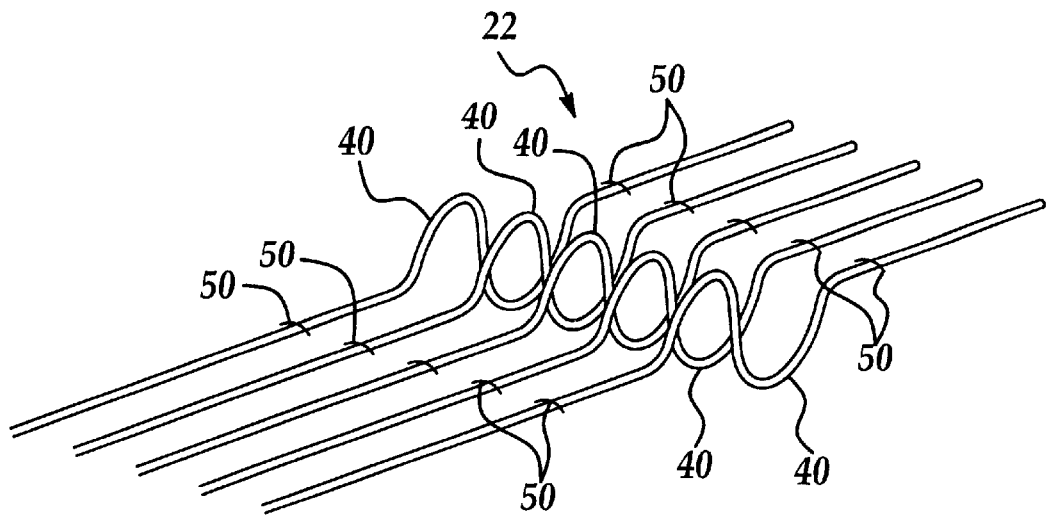
FIG. 4 is a perspective view illustrating five separate deformable fluid supply line of the present invention incorporating an S-shaped expandable joint in each line.

The present invention fluid supply line 22 is frequently used in a group of lines supported together by support 50 in a parallel manner, as shown in FIG. 4. Each of the plurality of fluid supply lines 22 can be used to transport a specific process gas, i.e. either a reactive gas or an inert gas.

Figure 5:
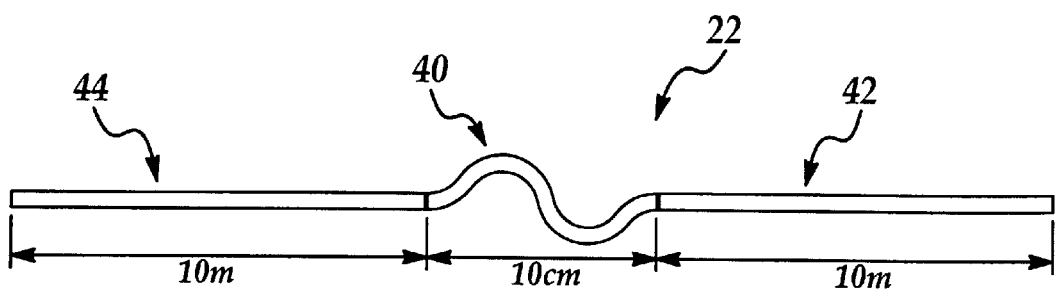
FIG. 5 is a cross-sectional view of a present invention deformable fluid supply line of two straight sections of rigid conduit connected by an S-shaped expandable joint.

It has been found that to effectively utilize the present invention fluid supply lines 22, each of the S-shaped expandable joint 40 when supplied in a length of about 10 cm, should be used in between two straight conduit sections 42,44 each having a length of about 10 cm. This is shown in FIG. 5. It should be noted that, for illustration purpose, the length of the S-shaped expandable joint 40 and the length of the straight conduit sections, 42,44 are not shown in proportion.

It has also been found that a minimal length of the S-shaped expandable joint should be about 5 cm in order for the joint to be effective in absorbing stresses due to stretching, compressing, twisting or bending. Longer length than 10 cm may be utilized based on the diameter of the piping and the specific requirement for the application. For the present invention fluid supply line 22, as shown in FIG. 5, the fluid supply line is capable of being deformed, i.e. by stretching to at least 2 cm, or preferably to at least 3.5 cm without breaking or otherwise damaging the connections with the straight conduit sections, when the total length of the S-shaped expandable joint is about 10 cm. When the deformation involved is twisting or bending of the fluid conduit, the present invention S-shaped deformable joint survives a deformation up to 45° when twisted or bent without causing failure in the straight conduit.

The present invention novel apparatus of a deformable fluid supply line for use on a semiconductor fabrication machine and a method for connecting a deformable fluid supply line to a fabrication machine have therefore been amply described in the above description and in the appended drawings of FIGS. 2~5.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. A deformable fluid supply line for a semiconductor fabrication machine comprising:
   a first rigid conduit having a first open end and an opposing second open end, said first open end being in fluid communication with a fluid reservoir;
   a second rigid conduit having a third open end and an opposing fourth open end, said fourth open end being in fluid communication with said semiconductor fabrication machine; and
   a generally S-shaped expandable joint for connecting and providing fluid communication between said second open end of said first rigid conduit and said third open end of said second rigid conduit, said generally S-shaped expandable joint being connected to said first and said second rigid conduit by welded joints, said expandable joint being stretched by at least 2 cm without fracturing and breaking connection with said first rigid conduit and said second rigid conduit.

2. A deformable fluid supply line for a semiconductor fabrication machine according to claim 1, wherein said generally S-shaped expandable joint being fabricated of stainless steel.

3. A deformable fluid supply line for a semiconductor fabrication machine according to claim 1, wherein said first and said second rigid conduct having a length of at least 5 m, and said generally S-shaped expandable joint having a length of at least 5 cm.

4. A deformable fluid supply line for a semiconductor fabrication machine according to claim 1, wherein said generally S-shaped expandable joint having a length of at least 10 cm to provide a deformation of at least 3.5 cm in said expandable joint without failure in said connections with said first and said second rigid conduit when said fluid supply line is deformed.

5. A deformable fluid supply line for a semiconductor fabrication machine according to claim 1, wherein said first and said second rigid conduit having a length of at least 10 m, and said generally S-shaped expandable joint having a length of at least 10 cm.

6. A deformable fluid supply line for a semiconductor fabrication machine according to claim 1, wherein said fluid supply line comprises at least three rigid conduit sections sealingly connected together by at least two S-shaped expandable joints.

7. A deformable fluid supply line for a semiconductor fabrication machine according to claim 1, wherein said fluid supply line comprises at least four rigid conduit sections sealingly connected together by at least three S-shaped expandable joints.

8. A deformable fluid supply line for a semiconductor fabrication machine according to claim 1, wherein said deformable fluid supply line being fabricated of stainless steel.

9. A deformable fluid supply line for a semiconductor fabrication machine according to claim 1, wherein said expandable joint survives deformation of at least 2 cm without causing failure in said connections with said first and said second conduit when said deformation is selected from the group consisting of stretching, compressing, twisting and bending.

10. An earthquake-proof fluid supply line incorporating at least one deformable joint therein comprising:
    a first conduit having a first and a second end, said first end in fluid communication with a fluid reservoir;
    a second conduct having a first and a second end, said second end in fluid communication with a cavity in a process chamber; and
    a deformable joint of generally S-shape making connections and providing fluid communication between said second end of the first conduct and the first end of the second conduit by welding to said second end and said first end.

11. A deformable fluid supply line incorporating at least one deformable joint therein according to claim 10, wherein said deformable joint of generally S-shape survives deformation of at least 2 cm when stretched or compressed without causing failure in said connections with said first and said second conduit.

12. A deformable fluid supply line incorporating at least one deformable joint therein according to claim 10, wherein said deformable joint of generally S-shape survives deformation up to 45° when twisted or bent without causing failure in said connections with said first and said second conduit.

13. A deformable fluid supply line incorporating at least one deformable joint therein according to claim 10, wherein said deformable joint of generally S-shape is fabricated of stainless steel.

14. A deformable fluid supply line incorporating at least one deformable joint therein according to claim 10, wherein said first and said second conduit having a length of at least 5 m, said generally S-shaped joint having a length of at least 5 cm.

15. A deformable fluid supply line incorporating at least one deformable joint therein according to claim 10, wherein said generally S-shaped deformable joint survives at least 2 cm on deformation without failure in said connections with said first and second conduit.

16. A method for connecting a deformable fluid supply line to a fabrication machine comprising the steps of:
    providing a first conduit having a first and a second end;
    connecting said first end of the first conduit to a fluid reservoir and providing fluid communication therewith;
    providing a second conduit having a first and a second end;
    connecting said second end of the second conduit to a fabrication machine and providing fluid communication therewith;
    providing a generally S-shaped deformable joint having two open ends; and
    connecting said two open ends of said S-shaped joint to said second end of the first conduit and said first end of the second conduit by a welding method, respectively such that said s-shaped joint survives a deformation of at least 2 cm without breaking connections with said first and second conduit.

17. A method for connecting a deformable fluid supply line to a fabrication machine according to claim 16, wherein said first and second conduit provided are made of stainless steel and have a length of at least 5 m.

18. A method for connecting a deformable fluid supply line to a fabrication machine according to claim 16, wherein said generally S-shaped deformable joint being fabricated of stainless steel to a length of at least 10 cm for providing a deformation of at least 3.5 cm in said deformable joint without failure to said connections.

* * * * *